United States Patent [19]

Notoyama et al.

[11] Patent Number: 5,117,675

[45] Date of Patent: Jun. 2, 1992

[54] METHOD OF AND APPARATUS FOR DETECTING PREDICTED FAILURE IN FLUID-PRESSURE SYSTEM

[75] Inventors: Shunichi Notoyama; Takashi Takebayashi; Mitsuhiro Saito, all of Sohka, Japan

[73] Assignee: SMC Corporation, Tokyo, Japan

[21] Appl. No.: 570,860

[22] Filed: Aug. 22, 1990

[30] Foreign Application Priority Data

Aug. 24, 1989 [JP] Japan .................................. 1-219899
Aug. 24, 1989 [JP] Japan .................................. 1-219900

[51] Int. Cl.⁵ .............................................. G01L 9/00
[52] U.S. Cl. ................................................... 73/37
[58] Field of Search ......................................... 73/37

[56] References Cited

U.S. PATENT DOCUMENTS 4,459,843  7/1984  Durham ................................. 73/37

FOREIGN PATENT DOCUMENTS

0269128  6/1988  European Pat. Off. .
2069144  8/1981  United Kingdom .

Primary Examiner—Hezron E. Williams
Assistant Examiner—Joseph W. Roskos
Attorney, Agent, or Firm—Oblon, Spivak, McClelland, Maier & Neustadt

[57] ABSTRACT

First and second thresholds are established which define a pressure difference relative to a maximum pressure level for a fluid under pressure, which maximum pressure level is detected by a pressure detecting device, and a third threshold is also established which is lower than the maximum pressure level and higher than the first and second thresholds. While a pressure detected by the pressure detecting device ranges between the first and second thresholds, an output signal is supplied to a drive member. When a pressure lower than the third threshold is detected by the pressure detecting device, an output signal indicative of a predicted failure is produced. The output signal indicative of a predicted failure is produced when a pressure lower than the third threshold is detected a plurality of times by the pressure detecting device.

21 Claims, 6 Drawing Sheets

METHOD OF AND APPARATUS FOR DETECTING PREDICTED FAILURE IN FLUID-PRESSURE SYSTEM

BACKGROUND OF THE INVENTION

1. Field of the Invention

The present invention relates to a method of detecting a predicted failure in a fluid-pressure system and an apparatus for carrying out such a method.

2. Discussion of the Background

Heretofore, fluid-pressure systems such as pneumatic pressure operated systems employ pressure switches for supplying a negative and/or positive pressure.

For example, a negative pressure switch is incorporated in a pneumatic pressure operated system which is composed of pneumatic pressure passages and a pneumatic pressure device and which is operable under a negative pneumatic pressure (vacuum). When a workpiece is fed by a suction pad under a negative pressure from the negative pressure system, the negative pressure switch is used to confirm whether the workpiece is attracted to or released from the pressure pad.

Figure 1:
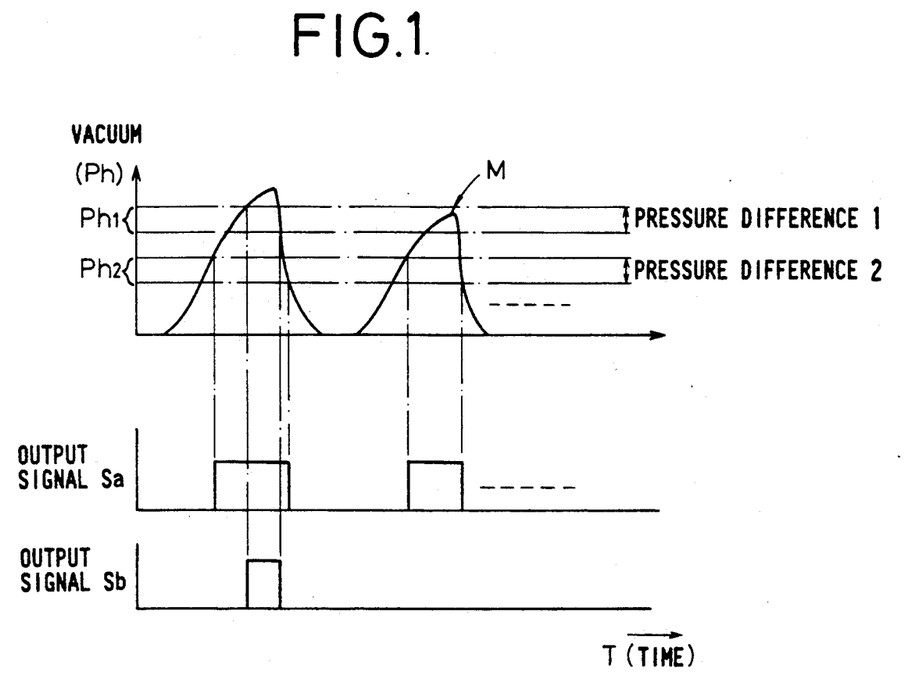
FIG. 1 is a diagram showing the relationship between a vacuum, pressure differences, and output signals for a conventional vacuum pressure switch.

One example of operation of such a vacuum pressure switch is shown in FIG. 1 of the accompanying drawings. The pressure switch is associated with a detecting circuit which is composed of a diffused transistor, an amplifier, an output circuit, and a rheostat. The detecting circuit transmits output signals Sa, Sb corresponding to pressure differences 1, 2 which are related to predetermined pressures at the time a workpiece is attracted and released, respectively. The pressure differences 1, 2 are employed to prevent the system from chattering.

The output signal Sa is produced according to a pressure threshold Ph2 which is of a relatively low vacuum, and the output signal Sb is produced according to a pressure threshold Ph1 which is higher in vacuum than the pressure threshold Ph2. The output signals Sa, Sb are supplied to a sequence controller which is connected to a computer for FA, for example, so that various control and drive means will be controlled.

The conventional vacuum pressure system usually does not have vacuum indicating means. When the pressure thresholds Ph1, Ph2 are to be established, a workpiece is repeatedly attracted and released by the pressure pad, and then the pressure thresholds Ph1, Ph2 are determined. Also, the rheostat is adjusted to supply output signals Sb, Sa corresponding to the determined pressure thresholds Ph1, Ph2. More specifically, values set by the rheostat are supplied as reference signals to comparators, and compared thereby with actual measured values from the detecting circuit, thus producing pressure differences. If many pressure switches are combined with a pneumatic pressure system, then errors tend to be developed between pressure value settings for the pressure switches. Stated otherwise, it is highly difficult to rely on a quantitive approach to establish and adjust pressure difference settings. When the workpiece is repeatedly attracted and released, furthermore, a maximum vacuum level that can be reached is lowered with time because of the clogging of a filter and an ejector malfunction. As a result, the pneumatic pressure system frequently experiences a condition in which the vacuum fails to reach a predetermined vacuum level that is used to confirm the attraction of a workpiece (i.e., an illustrated attracted/released condition M).

Comparison of the output signal Sa for the purpose of an advance announcement of filter replacement or the like requires switch output signals (pulsed signals) to be latched. As a consequence, a complex signal processing arrangement is necessary and hence the entire system becomes large and complex. The above drawbacks also hold true for a fluid-pressure system with positive pressure switches.

SUMMARY OF THE INVENTION

It is a principal object of the present invention to provide a method of and an apparatus for detecting a predicted failure in a fluid-pressure system, the method and apparatus being capable of relatively easily establishing a plurality of pressure thresholds between maximum pressures in order to produce a plurality of control signals to be used with a pneumatic pressure operated system or the like.

Another object of the present invention is to provide a method of and an apparatus for detecting a predicted failure in a fluid-pressure system, wherein a workpiece is repeatedly fed by a pneumatic pressure operated system, for example, and if the pressure in the system fails to reach a predetermined pressure level (a pressure level to determine a predicted failure), then a failure predicting signal is transmitted upon agreement of a detected pressure with the predetermined pressure level to make an announcement for advance judgment, and wherein various pressures such as the pressure level to determine a predicted failure, pressure differences, etc., can accurately and easily be established and clearly be indicated with a present pressure.

Still another object of the present invention is to provide a method of predicting a failure in a fluid-pressure system, comprising the steps of establishing first and second thresholds defining a pressure difference relative to a maximum pressure level for a fluid under pressure, which maximum pressure level is detected by a pressure detecting device, establishing a third threshold which is lower than the maximum pressure level and higher than the first and second thresholds, supplying an output signal to a driven member while a pressure detected by the pressure detecting device falls between the first and second thresholds, and producing an output signal indicative of a predicted failure when a pressure lower than the third threshold is detected by the pressure detecting device.

Yet another object of the present invention is to provide the method wherein the output signal indicative of a predicted failure is produced when a pressure lower than the third threshold is detected a plurality of times by the pressure detecting device.

Yet still another object of the present invention is to provide the method wherein the output signal indicative of a predicted failure is produced when a pressure lower than the third threshold is detected successively a plurality of times by the pressure detecting device.

A further object of the present invention is to provide the method wherein when a pressure exceeding the third threshold is detected by the pressure detecting device before a pressure lower than the third threshold is detected, detection of a pressure lower than the third threshold is reset.

A still further object of the present invention is to provide the method wherein the output signal supplied to the driven member is of a rectangular waveform having a positive-going edge produced when a pressure corresponding to the first threshold is detected and a negative-going edge produced when a pressure corresponding to the second threshold is detected.

A yet further object of the present invention is to provide the method wherein pressure corresponding the first and second thresholds are established with reference to the maximum pressure level detected by the pressure detecting device.

It is also an object of the present invention to provide an apparatus for predicting a failure in a fluidpressure system, comprising pressure detecting means for detecting a change in a fluid pressure, an A/D converter for converting a signal indicating a pressure detected by the pressure detecting means into a digital signal, means for transmitting a pressure switch signal corresponding to a pressure difference defined by first and second thresholds relative to a maximum pressure level of the fluid pressure which varies, determining means for comparing the maximum pressure level with a third threshold when the pressure switch signal is transmitted, and for producing a failure signal when the maximum pressure level is lower than the third threshold, failure predicting signal transmitting means for transmitting a failure predicting signal when the number of time at which the failure signal is produced reaches a predetermined count, and setting means for setting the first threshold, the second threshold, the third threshold, and the predetermined count.

Another object of the present invention is to provide the apparatus further including display means for displaying the detected fluid pressure, the first through third thresholds, and the number of times at which the failure signal is produced.

Still another object of the present invention is to provide the apparatus wherein the pressure detecting means comprises a semiconductor pressure sensor.

Yet another object of the present invention is to provide the apparatus wherein the display means comprises an LCD.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 2:
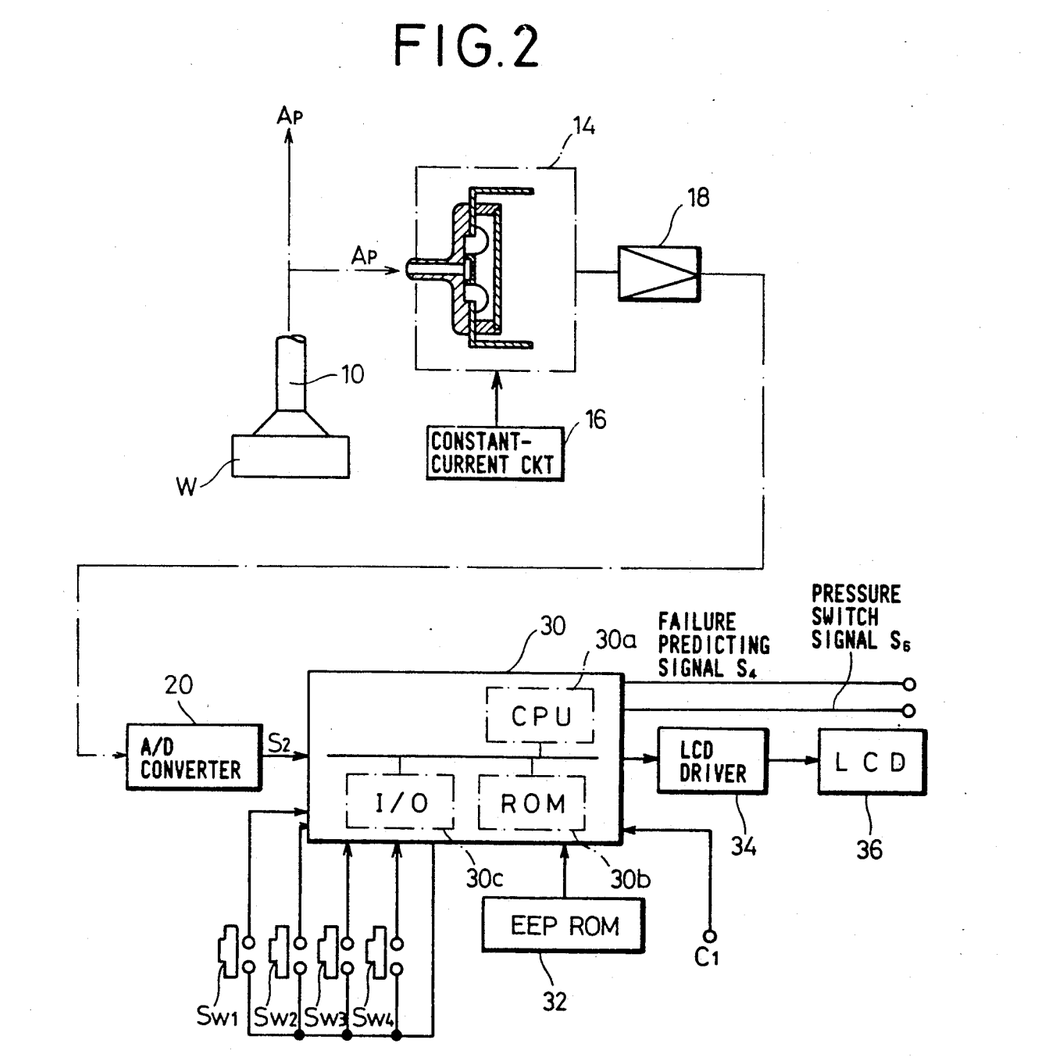
FIG. 2 is a block diagram of a predicted failure detecting apparatus according to the present invention.

As shown in FIG. 2, a predicted failure detecting apparatus according to the present invention is associated with a workpiece feeder for feeding a workpiece W, which workpiece feeder is incorporated in a vacuum system having a suction pad 10 for attracting the workpiece W. The suction pad 10 is connected to a vacuum generator (described later on) including an ejector.

The predicted failure detecting apparatus has a semiconductor pressure sensor 14 for detecting a vacuum or negative pressure of pressurized air Ap generated by the vacuum generator and for transmitting an electric signal indicative of the detected vacuum, a constant-current circuit 16 for supplying a constant current to the semiconductor pressure sensor 14, and an amplifier 18 for amplifying a detected pressure signal from the semiconductor pressure sensor 14. The predicted failure detecting apparatus also includes an A/D converter 20 for converting an analog signal representative of the pressure (negative pressure) of the pressurized air Ap into a digital signal, and a controller 30 comprising a one-chip microcomputer or the like. The controller 30 comprises a CPU 30a, a ROM 30b storing a control program, and an I/0 unit 30c. To the controller 30, there are connected up/down switches Sw1, Sw2 for increasing and reducing preset values, a setting switch Sw3, and a resetting switch Sw4.

The predicted failure detecting apparatus further includes an EE($E^2$)PROM 32 for storing pressure information detected by the semiconductor pressure sensor 14 and holding the stored pressure information when the power supply of the apparatus is turned off, an LCD driver 34 and an LCD 36 for visually displaying pressure settings (described later).

Figure 3:
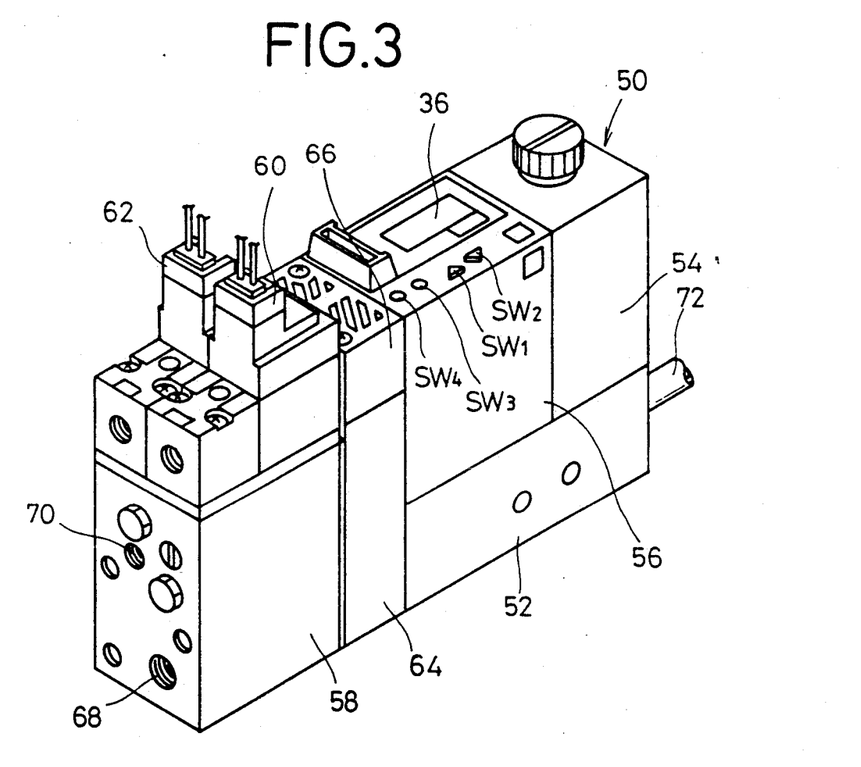
FIG. 3 is a perspective view of a vacuum generator which incorporates the predicted failure detecting apparatus shown in FIG. 2.

The vacuum generator which incorporates the predicted failure detecting apparatus will be described below with reference to FIG. 3.

The vacuum generator, generally designated by the reference numeral 50, includes a first block 52 in the shape of a rectangular parallelepiped, a filter unit 54 mounted on the first block 52, and a detector unit 56 including the predicted failure detecting apparatus. The vacuum generator 50 also has a second block 58 on which there are mounted a breaking valve 60 for breaking a vacuum, and a pilot pressure supply valve 62 for actuating a pilot valve disposed n the second block 58. An ejector housing 64 and a silencer 66 are disposed between the first block 52 and the second block 58. An LCD 36 is disposed on the upper surface of the detector unit 56 and a resetting button Sw4, a setting button Sw3, an up button Sw1, and a down button Sw2 are also disposed on the upper surface of the detector unit 56 alongside of the LCD 36. The second block 58 has a supply air pressure port 68 and a pilot valve discharge port 70. The first block 52 has a tube 72 which extends from a vacuum port (not shown) to the suction pad 0. In the predicted failure detecting apparatus, the semiconductor pressure sensor 14, the amplifier 18, the A/D converter 20, the controller 30, the EE($E^2$)PROM 32, and the LCD driver 34 are positioned in the detector unit 56.

The predicted failure detecting apparatus is basically constructed as described above. Operation of the predicted failure detecting apparatus will be described below with reference to FIG. 4.

Figure 4:
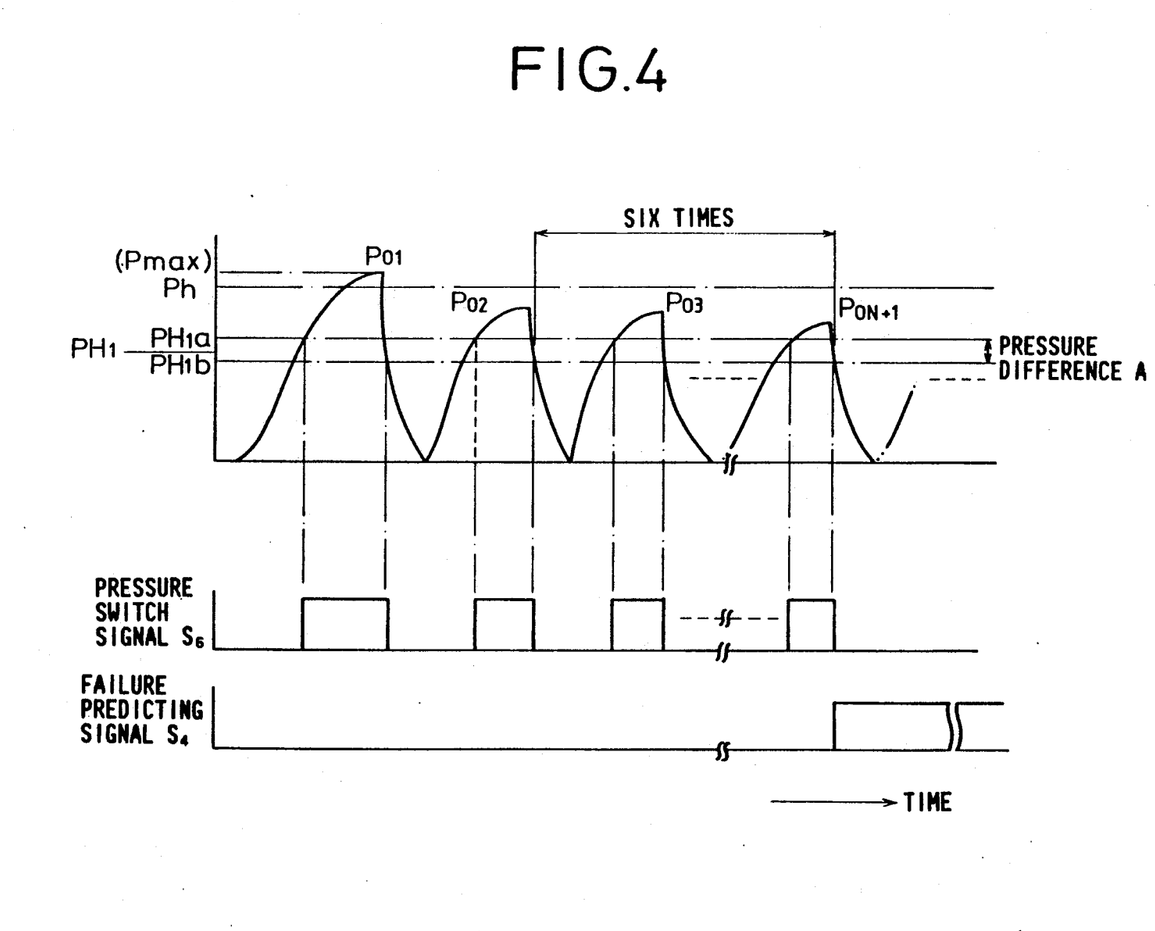
FIG. 4 is a diagram showing the manner in which the predicted failure detecting apparatus shown in FIG. 2 operates.

When an operation start command signal is supplied while the vacuum generator 50 is in operation, a feed means comprising a robot arm or the like which carries a workpiece W is displaced to cause the workpiece W to be attracted to the suction pad 10 which is mounted on the distal end of the robot arm. After the workpiece W has been displaced a given distance, it is released from the suction pad 10. At this time, the pressure (negative pressure) applied to the semiconductor pressure sensor 14 varies from a level $P_{O1}$ to a level $P_{O2}$ to a level $P_{O3}, \ldots$, and to a level $P_{ON+1}$. Owing to the clogging of an air filter, for example, the maximum pressure (vacuum) drops from $P_{O1}$ to $P_{ON+1}$ with time.

Pressure signals corresponding to the pressure levels $P_{O1}, P_{O2}, P_{O3}, \ldots, P_{ON+1}$ are produced by the semiconductor pressure sensor 14, amplified by the amplifier 18, and then converted by the A/D converter 20 into digital signals $S_2$, which are applied to the controller 30.

In the controller 30, the maximum pressure level (Pmax) of $P_{O1}$ is stored at a first address in the $EE(E^2)$-PROM 32.

Thereafter, the switch Sw3 is turned on to calculate pressure thresholds $PH_{la}$, $PH_{lb}$ relative to a pressure difference A, and the calculated pressure thresholds PHla, $PH_{lb}$ are stored in the $EE(E^2)PROM$ 32. More specifically, 70% of the maximum pressure level (Pmax) is calculated as the pressure threshold $PH_{la}$ and stored at a second address in the $EE(E^2)PROM$ 32, and then 65% of the maximum pressure level (Pmax) is calculated as the pressure threshold $PH_{lb}$ and stored at a third address in the $EE(E^2)PROM$ 32.

The calculation and storage of the maximum pressure level (Pmax), the pressure threshold $PH_{la}$, and the pressure threshold $PH_{lb}$ are carried out using the up button Sw1 and the down button Sw2, for example, After the maximum pressure level and thresholds have been set, a negative pressure is detected. More specifically, as the pressure varies from the pressure levels $P_{O1}$ through $P_{ON+1}$, a successive pressure switch signal $S_6$ is produced according to the thresholds $PH_{la}$, $PH_{lb}$. The pressure switch signal $S_6$ is used to control various control and drive means, such as a fully closed control system for the feed means, FMS, CIM, or the like for information processing therein.

Then, using the switches Sw1, Sw2, Sw3, 80 % of the maximum pressure level (Pmax) is calculated as a pressure threshold Ph and stored at a fourth address in the $EE(E^2)PROM$ 32.

The pressure threshold Ph is 20% lower than the maximum pressure level (Pmax, the maximum vacuum) of $P_{O1}$. Any pressure levels below the pressure threshold Ph are regarded as abnormal pressure conditions.

While the pressure levels $P_{O1}$ through $P_{ON+1}$ are being detected, those pressure levels below the pressure threshold Ph which are vacuums indicating the abnormal pressure conditions, i.e., the pressure levels $P_{O2}$ through $P_{ON+1}$ (represented by the detected digital signals $S_2$), are stored six times. If these pressure levels agree with six preset abnormal counts established in advance by the switches Sw1, Sw2, Sw3, then a failure predicting signal $S_4$ is continuously produced.

The failure predicting signal $S_4$ is produced according to a program executed by the controller 30. Information relative to the failure predicting signal $S_4$ is stored in the $EE(E^2)PROM$ 32. When the vacuum generator 50 is operated again after its power supply has been shut down, the failure predicting signal $S_4$ based on the above operating conditions is also produced.

In this manner, the pressure thresholds $PH_{la}$, $PH_{lb}$, Ph with respect to the maximum pressure level (Pmax) of $P_{O1}$ are automatically and accurately established and detected.

The preset values of the pressure thresholds $PH_{la}$, $PH_{lb}$, Ph, i.e., 70%, 65%, 80% of the maximum pressure level, can be modified. More specifically, when the resetting switch Sw4 is turned on, the preset pressure level values are cleared. Then, the up and down switches Sw1, Sw2 are selectively turned on to change the preset pressure level values in increments of 5%, and the newly selected pressure level values are preset by the switch Sw3.

While the pressure thresholds $PH_{la}$, $PH_{lb}$, Ph are established with respect to the maximum pressure level (Pmax) of $P_{O1}$ in the above embodiment, a pressure curve of $P_{O1}$ may be stored, and the pressure thresholds $PH_{la}$, $PH_{lb}$, Ph may be established according to the stored pressure curve in the manner described above.

Figure 5A:
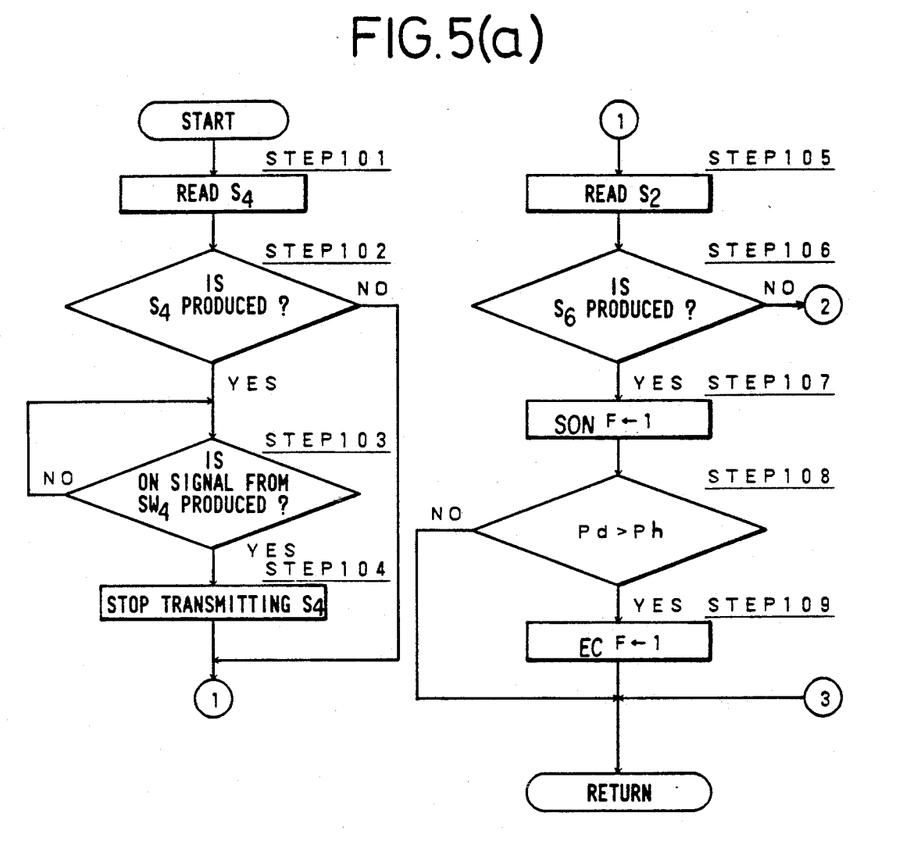
FIGS. 5(a) and (b) are flowcharts of a program for a controller in the predicted failure detecting apparatus illustrated in FIG. 2.
Figure 5B:
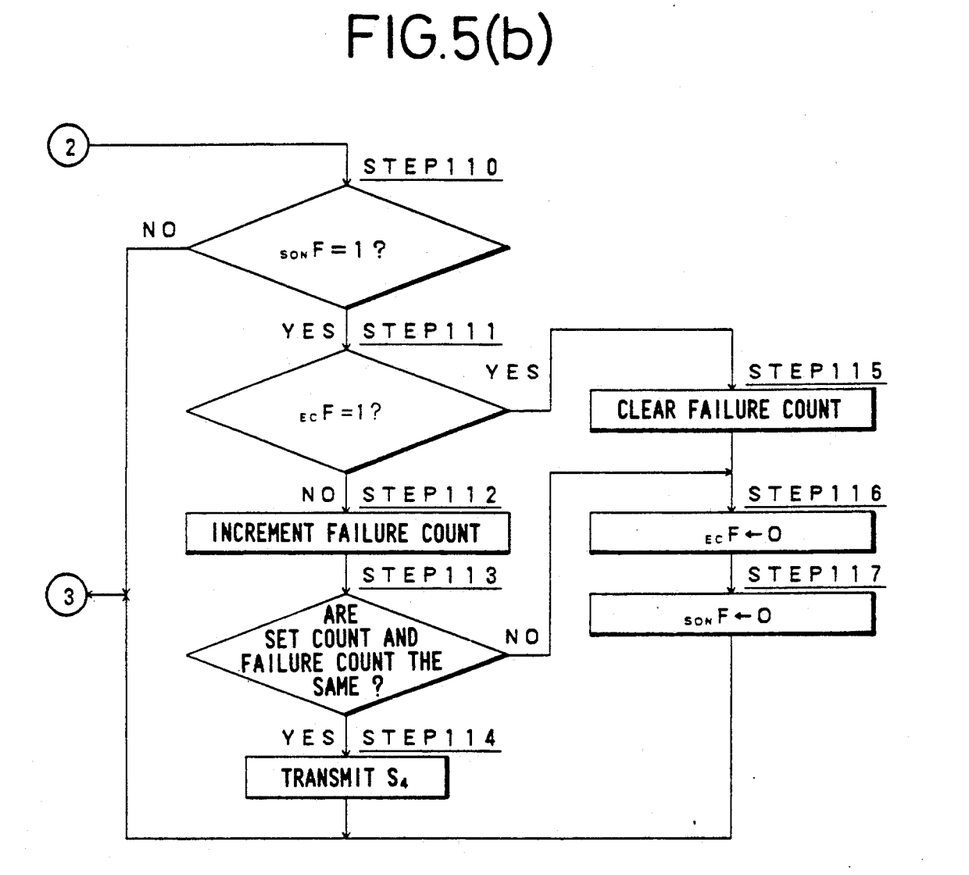

A sequence control process of the controller 30 for the generation of the failure predicting signal $S_4$ based on the program stored in the ROM 30b will now be described with reference to FIG. 5.

The program starts being executed in response to an operation start command signal $C_I$ for the entire predicted failure detecting apparatus.

(1) A failure predicting signal $S_4$ is read in a step 101.
(2) Then, a step 102 determines whether there is such a failure predicting signal $S_4$ or not. If there is, then control goes to a step 103, and if not, then control jumps to a step 105.
(3) The step 103 determines whether there is an ON signal from the switch Sw4 or not. If there is, control proceeds to a step 104, and if not, then the step 103 is repeated.
(4) The step 104 stops transmitting the failure predicting signal $S_4$.

In the steps 101 through 104, the continuously produced failure predicting signal $S_4$ is stopped.

(5) The step 105 reads a digital signal $S_2$ which is representative of the pressure detected by the semiconductor pressure sensor 14.
(6) Then, a step 106 determines whether there is a pressure switch signal $S_6$ or not. If there is, then control goes to a step 107, and if not, control jumps to a step 110.
(7) In the step 107, a flag $_{SON}F$ is set to 1. (The flag $_{SON}F$ is 0 when the pressure switch signal $S_6$ is OFF.)
(8) A step 108 determines whether vacuum data Pd (maximum value of the detected digital signal $S_2$) is larger than a vacuum level Ph for determining a predicted failure. If Pd is not larger than Ph, then the vacuum data Pd is determined as being normal, and control goes to RETURN. If Pd is larger than Ph, then control proceeds to a step 109.
(9) In the step 109, a flag $_{EC}F$ is set to 1. Then, control goes to RETURN.
(10) The step 110 determines whether the flag $_{SON}F$ is 1 or not. If the flag $_{SON}F$ is 1, then control goes to a step 111, and if not, then control goes to RETURN.
(11) The step 111 determines whether the flag $_{EC}F$ is 1 or not. If the flag $_{EC}F$ is 1, then control proceeds to a step 115, and if not, then control goes to a step 112.
(12) In the step 112, a failure count is incremented six times.
(13) The failure count (which has been incremented six times) and a preset count are compared with each other in a step 113. If the compared counts are the same, then control goes to a step 114, and if not, then control goes to a step 116.

(14) In the step 114, a failure predicting signal S4 is transmitted. Then, control goes to RETURN for a next decision cycle.

(15) When the pressure switch signal S6 is ON in the step 106, the vacuum data Pd may be larger than the vacuum level Ph. At this time, the detected value is determined as being normal, and the failure count is cleared.

(16) The flag $_{EC}F$ is reset to 0 in a step 116. Then, control goes to a step 117.

(17) The flag $_{SON}F$ is reset to 0 in the step 117. Then, control goes to RETURN for a next decision cycle.

As described above, the workpiece W is repeatedly fed, and when the maximum pressure level is lowered with time due to such repeated feeding of the workpiece, if the failure count with respect to the vacuum level Ph for determining a predicted failure coincides with a preset count, a failure predicting signal S4 is produced. Therefore, there is obtained advance information effective enough to announce the time to replace a clogged filter. Various pressure levels such as the vacuum level Ph and a pressure difference $PH_l$ can accurately and easily be preset. These preset pressure levels can clearly be indicated as well as the present pressure level.

In the above embodiment, the number n of times (failure count) the pressure fails to reach the vacuum level Ph for determining a predicted failure, and the preset number N (preset count) are each six. The failure predicting signal S4 is produced and transmitted before the pressure reaches a level which makes it impossible to feed the workpiece normally, so that the operator can make judgment in advance of the actual failure.

The reference used for determining a predicted failure can be modified depending on the arrangement of the feed means and operating condition thereof. For example, the reference may be established by a more effective empirical value, e.g., when one vacuum data Pd fails to reach the vacuum level Ph, or when the ratio at which the vacuum data Pd fails to reach the vacuum level Ph is in excess of a predetermined value in a certain number of times, or when the ratio at which vacuum data Pd fails to reach the vacuum level Ph is in excess of a predetermined value in a certain time. The program based on such a new reference is executed to produce and transmit the failure predicting signal S4 in the same manner as described above.

With the pressure information processing apparatus according to the present invention, as described above, when the maximum pressure level is lowered with time due to repeated feeding of a workpiece, if the pressure fails to reach a predetermined pressure level (for determining a predicted failure), a failure predicting signal is produced upon agreement of the predetermined pressure level with a preset value, allowing the operator to predict a failure in advance. Various pressure levels such as the pressure level for determining a predicted failure and a pressure difference can accurately and easily be established, and can clearly be indicated as well as the present pressure level.

Although a certain preferred embodiment has been shown and described, it should be understood that many changes and modifications may be made therein without departing from the scope of the appended claims.

We claim:

1. A method of predicting a failure in a fluid-pressure system, comprising the steps of:
   establishing first and second thresholds defining a pressure difference as predetermined ratios of a maximum pressure reference level for a fluid under pressure, which maximum pressure reference level is detected by a pressure detecting device;
   establishing a third threshold which is lower than said maximum pressure reference level and higher than said first and second thresholds;
   supplying an output signal to a driven member while a pressure detecting by said pressure detecting device falls between said first and second thresholds; and
   producing an output signal indicative of a predicted failure when a maximum pressure of said fluid under pressure lower than said third threshold is detected by said pressure detecting device.

2. A method according to claim 1, wherein said output signal indicative of a predicted failure is produced when a pressure lower than said third threshold is detected a plurality of times by said pressure detecting device.

3. A method according to claim 2, wherein said output signal indicative of a predicted failure is produced when a pressure lower than said third threshold is detected successively a plurality of times by said pressure detecting device.

4. A method according to claim 3, wherein when a pressure exceeding said third threshold is detected by said pressure detecting device before a pressure lower than said third threshold is detected, detection of a pressure lower than said third threshold is reset.

5. A method according to claim 1, wherein said output signal supplied to the driven member is of a rectangular waveform having a positive-going edge produced when a pressure corresponding to said first threshold is detected and a negative-going edge produced when a pressure corresponding to said second threshold is detected.

6. A method according to claim 1, further comprising:
   determining a cause in said fluid-pressure system giving rise to said producing of said output signal indicative of said predicted failure and correcting said cause.

7. A method of predicting a failure in a fluid-pressure system, comprising the steps of:
   establishing first and second thresholds defining a pressure difference relative to a maximum pressure level for a fluid under pressure, which maximum pressure level is detected by a pressure detecting device;
   establishing a third threshold which is lower than said maximum pressure level and higher than said first and second thresholds;
   supplying an output signal to a driven member while a pressure detected by said pressure detecting device falls between said first and second thresholds; and
   producing an output signal indicative of a predicted failure when a pressure lower than said third threshold is detected by said pressure detecting device;
   wherein said output signal indicative of a predicted failure is produced when a pressure lower than said third threshold is detected a plurality of times by said pressure detecting device.

8. A method according to claim 7, wherein said output signal indicative of a predicted failure is produced when a pressure lower than said third threshold is detected successively a plurality of times by said pressure detecting device.

9. A method according to claim 8, wherein when a pressure exceeding said third threshold is detected by said pressure detecting device before a pressure lower than said third threshold is detected, detection of a pressure lower than said third threshold is reset.

10. A method according to claim 7, wherein pressures corresponding said first and second thresholds are established with reference to the maximum pressure level detected by said pressure detecting device.

11. A method according to claim 7, further comprising:
    determining a cause in said fluid-pressure system giving rise to said producing of said output signal indicative of said predicted failure and correcting said cause.

12. A method of predicting a failure in a fluid-pressure system, comprising the steps of:
    establishing first and second thresholds defining a pressure difference relative to a maximum pressure level for a fluid under pressure, which maximum pressure level is detected by a pressure detecting device;
    establishing a third threshold which is lower than said maximum pressure level and higher than said first and second thresholds;
    supplying an output signal to a driven member while a pressure detected by said pressure detecting device falls between said first and second thresholds; and
    producing an output signal indicative of a predicted failure when a pressure lower than said third threshold is detected by said pressure detecting device;
    wherein said output signal supplied to the driven member is of a rectangular waveform having a positive-going edge produced when a pressure corresponding to said first threshold is detected and a negative-going edge produced when a pressure corresponding to said second threshold is detected.

13. A method according to claim 12, wherein pressures corresponding said first and second thresholds are established with reference to the maximum pressure level detected by said pressure detecting device.

14. A method according to claim 12, wherein said output signal indicative of a predicted failure is produced when a pressure lower than aid third threshold is detected a plurality of times by said pressure detecting device.

15. A method according to claim 14, wherein said output signal indicative of a predicted failure is produced when a pressure lower than said third threshold is detected successively a plurality of times by said pressure detecting device.

16. A method according to claim 15, wherein when a pressure exceeding said third threshold is detected by said pressure detecting device before a pressure lower than said third threshold is detected, detection of a pressure lower than said third threshold is reset.

17. A method according to claim 12, further comprising:
    determining a cause in said fluid-pressure system giving rise to said producing of said output signal indicative of said predicted failure and correcting said cause.

18. An apparatus for predicting a failure in a fluid-pressure system, comprising:
    pressure detecting means for detecting a change in a fluid pressure;
    an A/D converter for converting a signal indicating a pressure detected by said pressure detecting means into a digital signal;
    means for transmitting a pressure switch signal corresponding to a pressure difference defined by first and second thresholds relative to a maximum pressure level of the fluid pressure which varies;
    determining means for comparing said maximum pressure level with a third threshold when said pressure switch signal is transmitted, and for producing a failure signal when said maximum pressure level is lower than said third threshold;
    failure predicting signal transmitting means for transmitting a failure predicting signal when the number of times at which said failure signal is produced reaches a predetermined count; and
    setting means for setting said first threshold, said second threshold, said third threshold, and said predetermined count.

19. An apparatus according to claim 18, further including display means for displaying said detected fluid pressure, said first through third thresholds, and the number of times at which said failure signal is produced.

20. An apparatus according to claim 19, wherein said display means comprises an LCD.

21. An apparatus according to claim 18, wherein said pressure detecting means comprises a semiconductor pressure sensor.

* * * * *